United States Patent
Natesan et al.

(10) Patent No.: US 10,902,219 B2
(45) Date of Patent: Jan. 26, 2021

(54) NATURAL LANGUAGE PROCESSING BASED SIGN LANGUAGE GENERATION

(71) Applicant: ACCENTURE GLOBAL SOLUTIONS LIMITED, Dublin (IE)

(72) Inventors: VijayChandar Natesan, Bangalore (IN); Mathangi Gopalan Sandilya, Bangalore (IN); Azarudeen Anifa, Bangalore (IN); Poonam Mishra, Bangalore (IN); Sachin Khandelwal, Rayagada (IN); Swati Rohit Ghiya, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 77 days.

(21) Appl. No.: 16/358,364

(22) Filed: Mar. 19, 2019

(65) Prior Publication Data
US 2020/0159833 A1    May 21, 2020

(30) Foreign Application Priority Data

Nov. 21, 2018  (IN) .............................. 201811043846

(51) Int. Cl.
*G06F 40/56* (2020.01)
*G09B 21/00* (2006.01)
(Continued)

(52) U.S. Cl.
CPC ............ *G06F 40/56* (2020.01); *G06F 40/289* (2020.01); *G06F 40/35* (2020.01); *G09B 21/009* (2013.01);
(Continued)

(58) Field of Classification Search
CPC ...... G09B 21/009; G10L 15/265; G10L 21/06; G10L 2021/065; G10L 21/10;
(Continued)

(56) References Cited

U.S. PATENT DOCUMENTS 5,887,069 A * 3/1999 Sakou ................ G06K 9/00355
382/100
6,119,077 A * 9/2000 Shinozaki ............... G06F 40/47
704/3
(Continued)

FOREIGN PATENT DOCUMENTS

WO    2013/091075    6/2013

OTHER PUBLICATIONS

Traci Patricia Weast, "Questions in American Sign Language: A Quantitative Analysis of Raised and Lowered Eyebrows", Aug. 8, 2008 (Year: 2008).*
(Continued)

*Primary Examiner* — Eric Yen
(74) *Attorney, Agent, or Firm* — Mannava & Kang, P.C.

(57) ABSTRACT

In some examples, natural language processing based sign language generation may include ascertaining a speech video that is selected by a user, and determining, based on application of natural language processing to contents of the speech video, a plurality of sentences included in the speech video. For each sentence of the plurality of sentences identified in the speech video, a sign language sentence type, a sign language sentence structure, and a sentiment may be determined. For each sign language sentence structure and based on a corresponding sentiment, a sign video may be determined. Based on the sign video determined for each sentence of the plurality of sentences identified in the speech video, a combined sign video may be generated.

20 Claims, 10 Drawing Sheets

(51) Int. Cl.
*G06F 40/35* (2020.01)
*G06F 40/289* (2020.01)
*G10L 21/06* (2013.01)
*G10L 21/10* (2013.01)
*G10L 25/63* (2013.01)

(52) U.S. Cl.
CPC .............. *G10L 21/06* (2013.01); *G10L 21/10* (2013.01); *G10L 25/63* (2013.01); *G10L 2021/065* (2013.01)

(58) Field of Classification Search
CPC ..... G10L 25/63; G06F 40/268; G06F 40/279; G06F 40/284; G06F 40/289; G06F 40/30; G06F 40/35; G06F 40/40; G06F 40/56
See application file for complete search history.

(56) References Cited

U.S. PATENT DOCUMENTS

| | | | | |
|---|---|---|---|---|
| 6,243,669 | B1* | 6/2001 | Horiguchi | G06F 40/45 704/9 |
| 6,377,925 | B1* | 4/2002 | Greene, Jr. | G10L 21/06 379/52 |
| 7,613,613 | B2* | 11/2009 | Fields | 704/272 |
| 7,676,372 | B1* | 3/2010 | Oba | G10L 21/0364 704/271 |
| 8,554,701 | B1* | 10/2013 | Dillard | G06F 40/30 706/12 |
| 8,612,204 | B1* | 12/2013 | Uszkoreit | G06F 40/45 704/2 |
| 9,436,755 | B1* | 9/2016 | Subramanya | G06F 40/30 |
| 10,178,218 | B1* | 1/2019 | Vadodaria | H04W 4/50 |
| 10,242,669 | B1* | 3/2019 | Sandler | G10L 15/1815 |
| 10,248,648 | B1* | 4/2019 | Thomas | G06F 40/211 |
| 2002/0111794 | A1* | 8/2002 | Yamamoto | G10L 15/24 704/200 |
| 2002/0140718 | A1* | 10/2002 | Yan | G10L 21/06 715/706 |
| 2003/0121026 | A1* | 6/2003 | Wang | G06F 40/211 717/124 |
| 2003/0182102 | A1* | 9/2003 | Corston-Oliver | G06F 40/56 704/9 |
| 2004/0106091 | A1* | 6/2004 | Weiner | G09B 19/00 434/236 |
| 2004/0111272 | A1* | 6/2004 | Gao | G06F 40/55 704/277 |
| 2005/0108001 | A1* | 5/2005 | Aarskog | G06F 40/289 704/10 |
| 2005/0289582 | A1* | 12/2005 | Tavares | H04H 60/33 725/10 |
| 2006/0129400 | A1* | 6/2006 | Fields | 704/260 |
| 2013/0325442 | A1* | 12/2013 | Dahlmeier | G06F 40/274 704/9 |
| 2014/0046661 | A1* | 2/2014 | Bruner | G06F 40/56 704/235 |
| 2015/0039295 | A1* | 2/2015 | Soschen | G06F 40/40 704/9 |
| 2015/0107530 | A1* | 4/2015 | Shani | H04L 51/32 119/712 |
| 2015/0161109 | A1* | 6/2015 | Talbot | G06F 40/216 704/2 |
| 2015/0254235 | A1* | 9/2015 | Whitley | G06F 3/038 704/3 |
| 2015/0317304 | A1* | 11/2015 | An | H04N 21/854 386/285 |
| 2016/0364377 | A1* | 12/2016 | Krishnamurthy | G06F 40/30 |
| 2017/0078478 | A1 | 3/2017 | Wohlert et al. | |
| 2017/0092293 | A1 | 3/2017 | Kristjansson | |
| 2017/0236450 | A1 | 8/2017 | Jung et al. | |
| 2018/0101520 | A1* | 4/2018 | Fuchizaki | G06F 40/30 |
| 2018/0301061 | A1* | 10/2018 | Paudyal | G09B 21/009 |

OTHER PUBLICATIONS

Naomi E. Goldstein & Robert S. Feldman, "Knowledge of American sign language and the ability of hearing individuals to decode facial expressions of emotion", Jun. 1996, Journal of Nonverbal Behavior 20, 111-122 (Year: 1996).*

Sara Morrissey, "Data-driven machine translation for sign languages", 2008 (Year: 2008).*

Lynette Van Zijl and Andries Combrink, "The South African Sign Language Machine Translation Project: Issues on Non-manual Sign Generation", 2006, Proceedings of South African Institute for Computer Scientists and Information Technologists Conference (SAICSIT 06), pp. 127-134 (Year: 2006).*

* cited by examiner

| Word | Lemma | PoS | Dep | Root Word | LeftChild | RightChild |
|---|---|---|---|---|---|---|
| I | -PRON- | PRON | nsubj | going | [] | [] |
| am | be | VERB | aux | going | [] | [] |
| going | go | VERB | ROOT | going | ['I', 'am'] | ['to', 'tomorrow'] |
| to | to | ADP | prep | going | [] | ['library'] |
| the | the | DET | det | library | ['the'] | [] |
| library | library | NOUN | pobj | to | [] | [] |
| tomorrow | tomorrow | NOUN | npadvmod | going | [] | [] |

```
┌─────────────────────────────────────────────────────────┐
│ ASCERTAIN, BY AT LEAST ONE HARDWARE PROCESSOR, A SPEECH │
│         VIDEO THAT IS SELECTED BY A USER                │
│                        602                              │
└─────────────────────────────────────────────────────────┘
                           │
                           ▼
┌─────────────────────────────────────────────────────────┐
│ DETERMINE, BY THE AT LEAST ONE HARDWARE PROCESSOR AND   │
│ BASED ON APPLICATION OF NATURAL LANGUAGE PROCESSING TO  │
│ CONTENTS OF THE SPEECH VIDEO, A PLURALITY OF SENTENCES  │
│             INCLUDED IN THE SPEECH VIDEO                │
│                        604                              │
└─────────────────────────────────────────────────────────┘
                           │
                           ▼
┌─────────────────────────────────────────────────────────┐
│ DETERMINE, BY THE AT LEAST ONE HARDWARE PROCESSOR AND BASED │
│ ON APPLICATION OF THE NATURAL LANGUAGE PROCESSING TO THE│
│ CONTENTS OF THE SPEECH VIDEO, A DURATION OF EACH SENTENCE OF │
│  THE PLURALITY OF SENTENCES INCLUDED IN THE SPEECH VIDEO│
│                        606                              │
└─────────────────────────────────────────────────────────┘
                           │
                           ▼
┌─────────────────────────────────────────────────────────┐
│ DETERMINE, BY THE AT LEAST ONE HARDWARE PROCESSOR AND FOR │
│ EACH SENTENCE OF THE PLURALITY OF SENTENCES IDENTIFIED IN │
│   THE SPEECH VIDEO, A SIGN LANGUAGE SENTENCE TYPE       │
│                        608                              │
└─────────────────────────────────────────────────────────┘
                           │
                           ▼
┌─────────────────────────────────────────────────────────┐
│ DETERMINE, BY THE AT LEAST ONE HARDWARE PROCESSOR AND FOR │
│ EACH SENTENCE OF THE PLURALITY OF SENTENCES IDENTIFIED IN │
│ THE SPEECH VIDEO AND BASED ON THE SIGN LANGUAGE SENTENCE│
│  TYPE, BASED ON MOVEMENT OF SPECIFIED WORDS, A SIGN     │
│             LANGUAGE SENTENCE STRUCTURE                 │
│                        610                              │
└─────────────────────────────────────────────────────────┘
                           │
                           ▼
┌─────────────────────────────────────────────────────────┐
│ DETERMINE, BY THE AT LEAST ONE HARDWARE PROCESSOR AND FOR │
│ EACH SENTENCE OF THE PLURALITY OF SENTENCES IDENTIFIED IN │
│         THE SPEECH VIDEO, A SENTIMENT                   │
│                        612                              │
└─────────────────────────────────────────────────────────┘
```

DETERMINING, BY THE AT LEAST ONE HARDWARE PROCESSOR AND FOR EACH SIGN LANGUAGE SENTENCE STRUCTURE AND BASED ON A CORRESPONDING SENTIMENT, A SIGN VIDEO
614

GENERATING, BY THE AT LEAST ONE HARDWARE PROCESSOR, BASED ON THE SIGN VIDEO DETERMINED FOR EACH SENTENCE OF THE PLURALITY OF SENTENCES IDENTIFIED IN THE SPEECH VIDEO AND BASED ON THE DURATION OF EACH SENTENCE OF THE PLURALITY OF SENTENCES INCLUDED IN THE SPEECH VIDEO, A COMBINED SIGN VIDEO
616

*FIG. 6 (CONT.)*

NATURAL LANGUAGE PROCESSING BASED SIGN LANGUAGE GENERATION

PRIORITY

The present application claims priority under 35 U.S.C. 119(a)-(d) to Indian patent application number 201811043846, having a filing date of Nov. 21, 2018, the disclosure of which is hereby incorporated by reference in its entirety.

BACKGROUND

A variety of techniques may be used to generate a sign language video. For example, a sign language interpreter may listen to a speaker, and translate words spoken by the speaker into sign language by using sign language gestures. The sign language gestures performed by the interpreter may be captured in a video format to generate the sign language video.

BRIEF DESCRIPTION OF DRAWINGS

Features of the present disclosure are illustrated by way of example and not limited in the following figure(s), in which like numerals indicate like elements, in which:

FIG. 3 illustrates a word dependency table through natural language processing to illustrate operation of the natural language processing based sign language generation apparatus of FIG. 1 in accordance with an example of the present disclosure;

FIG. 6 illustrates a flowchart of an example method for natural language processing based sign language generation in accordance with an example of the present disclosure.

DETAILED DESCRIPTION

Figure 1:
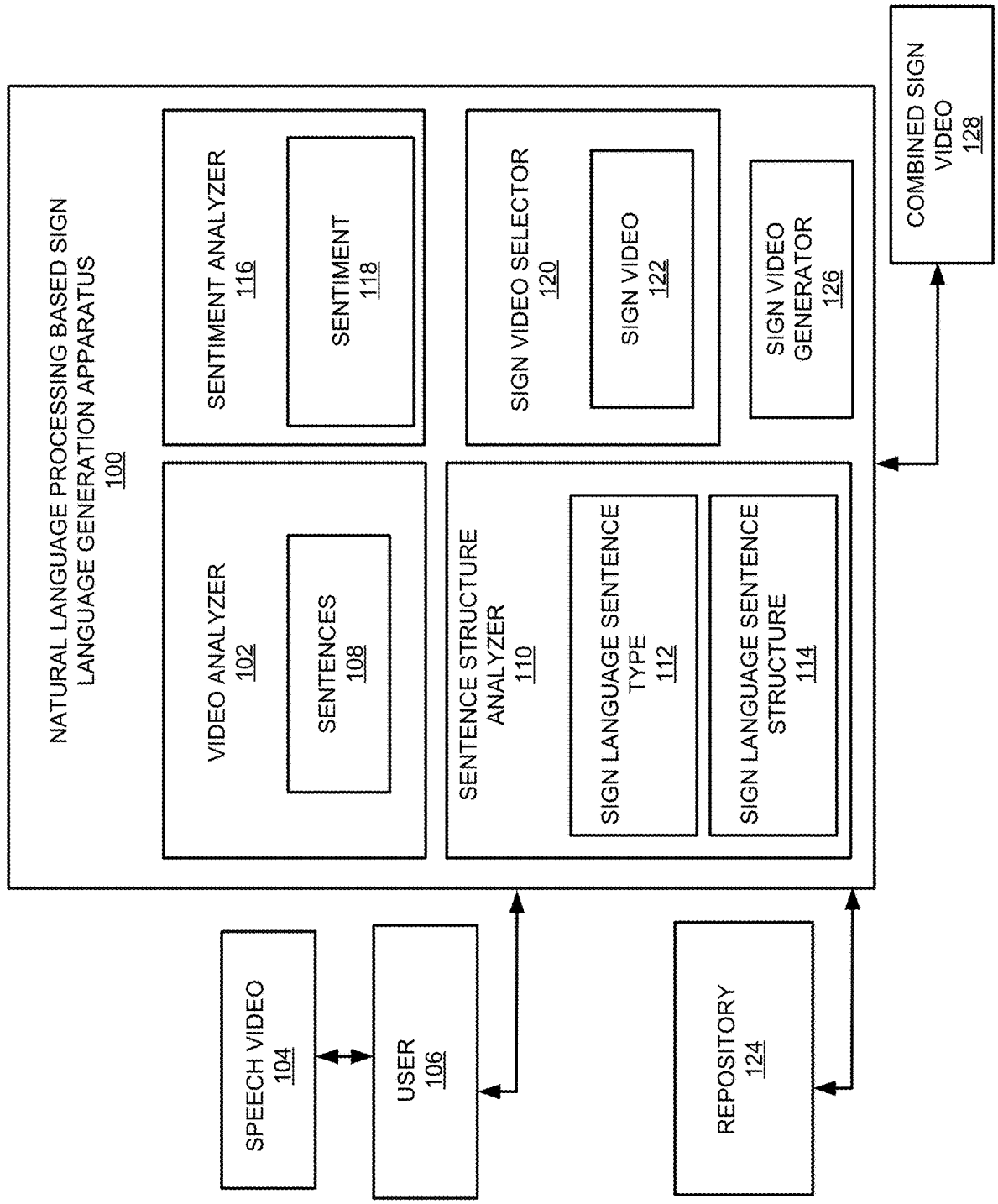
FIG. 1 illustrates a layout of a natural language processing (NLP) based sign language generation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Natural language processing based sign language generation apparatuses, methods for natural language processing based sign language generation, and non-transitory computer readable media having stored thereon machine readable instructions to provide natural language processing based sign language generation are disclosed herein. The apparatuses, methods, and non-transitory computer readable media disclosed herein provide for natural language processing based sign language generation by generating sign language videos that adhere to a sign language sentence structure.

With respect to sign language video generation, it is technically challenging to objectively interpret sentences spoken by a speaker. For example, it is technically challenging to objectively determine different attributes of a speaker and sentences spoken by the speaker to translate the sentences into sign language. It is also technically challenging to generate a computerized sign language video that objectively and accurately corresponds to sentences spoken by a speaker, for example, in another video of a speaker.

The apparatuses, methods, and non-transitory computer readable media disclosed herein address at least the aforementioned technical challenges by implementing natural language processing to extract, from a speech video of a speaker, sentences, along with their duration. In this regard, the apparatuses, methods, and non-transitory computer readable media disclosed herein provide for the conversion of speech to sign language by translating the speech at the sentence level. By using natural language processing, the apparatuses, methods, and non-transitory computer readable media disclosed herein may extract each sentence from a speech video, and translate each sentence to sign language standard. Further, for each sentence, along with the sentence, the sentence start and end times may be identified in the speech video. The sentence start and end times may be utilized to ensure that the sign language video that is generated and the original speech video play in sync based, for example, on alignment of each sentence start and end time.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example natural language processing based sign language generation apparatus (hereinafter also referred to as "apparatus 100").

Referring to FIG. 1, the apparatus 100 may include a video analyzer 102 that is executed by at least one hardware processor (e.g., the hardware processor 502 of FIG. 5, and/or the hardware processor 704 of FIG. 7) to ascertain a speech video 104 that is selected by a user 106.

The video analyzer 102 may determine, based on application of natural language processing to contents of the speech video 104, a plurality of sentences 108 included in the speech video 104.

According to examples disclosed herein, the video analyzer 102 may determine, based on application of the natural language processing to the contents of the speech video 104, a duration of each sentence of the plurality of sentences 108 included in the speech video 104.

A sentence structure analyzer 110 that is executed by at least one hardware processor (e.g., the hardware processor 502 of FIG. 5, and/or the hardware processor 704 of FIG. 7) may determine, for each sentence of the plurality of sentences 108 identified in the speech video 104, a sign language sentence type 112.

According to examples disclosed herein, the sentence structure analyzer 110 may determine, for each sentence of the plurality of sentences 108 identified in the speech video 104, the sign language sentence type 112 by determining, for each sentence of the plurality of sentences 108 identified in the speech video 104, whether a sentence includes a conjunction word. Further, for each sentence of the plurality of sentences 108 identified in the speech video 104, based on a determination that the sentence includes the conjunction word, the sentence structure analyzer 110 may classify the sentence as a compound.

According to examples disclosed herein, the sentence structure analyzer 110 may determine, for each sentence of the plurality of sentences 108 identified in the speech video 104, the sign language sentence type 112 by determining, for each sentence of the plurality of sentences 108 identified in the speech video 104, whether a sentence includes a "wh" word. Further, for each sentence of the plurality of sentences 108 identified in the speech video 104, based on a determination that the sentence includes the "wh" word, the sentence structure analyzer 110 may classify the sentence as a question.

According to examples disclosed herein, the sentence structure analyzer 110 may determine, for each sentence of the plurality of sentences 108 identified in the speech video 104, the sign language sentence type 112 by determining, for each sentence of the plurality of sentences 108 identified in the speech video 104, whether a sentence does not include a nominal subject. For each sentence of the plurality of sentences 108 identified in the speech video 104, based on a determination that the sentence does not include the nominal subject, the sentence structure analyzer 110 may classify the sentence as a clause.

The sentence structure analyzer 110 may determine, for each sentence of the plurality of sentences 108 identified in the speech video 104 and based on the sign language sentence type 112, based on movement of specified words, a sign language sentence structure 114.

According to examples disclosed herein, the sentence structure analyzer 110 may determine, for each sentence of the plurality of sentences 108 identified in the speech video 104 and based on the sign language sentence type 112, based on movement of specified words, the sign language sentence structure 114 by excluding, for each sentence of the plurality of sentences 108 identified in the speech video 104, particles, words with dependencies, determinants, conjunctions, and interjections. The sentence structure analyzer 110 may determine, for each sentence of the plurality of sentences 108 identified in the speech video 104 and based on the sign language sentence type 112, based on the exclusion of particles, words with dependencies, determinants, conjunctions, and interjections, the sign language sentence structure 114.

According to examples disclosed herein, the sentence structure analyzer 110 may determine, for each sentence of the plurality of sentences 108 identified in the speech video 104 and based on the sign language sentence type 112, based on movement of specified words, the sign language sentence structure 114 by determining, for each sentence of the plurality of sentences 108 identified in the speech video 104, whether a part of a sentence conveys time. The sentence structure analyzer 110 may form, for each sentence of the plurality of sentences 108 identified in the speech video 104 and based on the sign language sentence type 112, based on a determination that the part of the sentence conveys time, a first part that represents a time of the sentence for the sign language sentence structure 114.

According to examples disclosed herein, the sentence structure analyzer 110 may determine, for each sentence of the plurality of sentences 108 identified in the speech video 104 and based on the sign language sentence type 112, based on movement of specified words, the sign language sentence structure 114 by determining, for each sentence of the plurality of sentences 108 identified in the speech video 104, whether a dependency of a word is a nominal subject or a compound. The sentence structure analyzer 110 may form, for each sentence of the plurality of sentences 108 identified in the speech video 104 and based on the sign language sentence type 112, based on a determination that the dependency of the word is the nominal subject or the compound, a second part that represents a topic of the sentence for the sign language sentence structure 114.

According to examples disclosed herein, the sentence structure analyzer 110 may determine, for each sentence of the plurality of sentences 108 identified in the speech video 104 and based on the sign language sentence type 112, based on movement of specified words, the sign language sentence structure 114 by determining, for each sentence of the plurality of sentences 108 identified in the speech video 104, whether a part of a word is a verb or an adverb. The sentence structure analyzer 110 may form, for each sentence of the plurality of sentences 108 identified in the speech video 104 and based on the sign language sentence type 112, based on a determination that the part of the word is the verb or the adverb, a third part that represents a comment or action of the sentence for the sign language sentence structure 114.

According to examples disclosed herein, the sentence structure analyzer 110 may determine, for each sentence of the plurality of sentences 108 identified in the speech video 104 and based on the sign language sentence type 112, based on movement of specified words, the sign language sentence structure 114 by determining, for each sentence of the plurality of sentences 108 identified in the speech video 104, remaining words of the sentence. The sentence structure analyzer 110 may form, for each sentence of the plurality of sentences 108 identified in the speech video 104 and based on the sign language sentence type 112, based on a determination of the remaining words of the sentence, a fourth part that represents a referent of the sentence for the sign language sentence structure 114.

A sentiment analyzer 116 that is executed by at least one hardware processor (e.g., the hardware processor 502 of FIG. 5, and/or the hardware processor 704 of FIG. 7) may determine, for each sentence of the plurality of sentences 108 identified in the speech video 104, a sentiment 118.

A sign video selector 120 that is executed by at least one hardware processor (e.g., the hardware processor 502 of FIG. 5, and/or the hardware processor 704 of FIG. 7) may determine, for each sign language sentence structure and based on a corresponding sentiment, a sign video 122. For example, the sign videos may be disposed in a repository 124.

The sign video selector 120 may identify a language type associated with a preferred sign language of the user 106. The sign video selector 120 may determine, for each sign language sentence structure 114 and based on a corresponding sentiment, and based on the identification of the language type associated with the preferred sign language of the user, the sign video 122.

A sign video generator 126 that is executed by at least one hardware processor (e.g., the hardware processor 502 of FIG. 5, and/or the hardware processor 704 of FIG. 7) may generate, based on the sign video 122 determined for each sentence of the plurality of sentences 108 identified in the speech video 104, a combined sign video 128.

The sign video generator 126 may identify, in the combined sign video 128, an object and/or a person. The sign video generator 126 may highlight, in the combined sign video 128, the identified object and/or person.

Operation of the apparatus 100 is described in further detail with reference to FIGS. 1-4.

Figure 2:
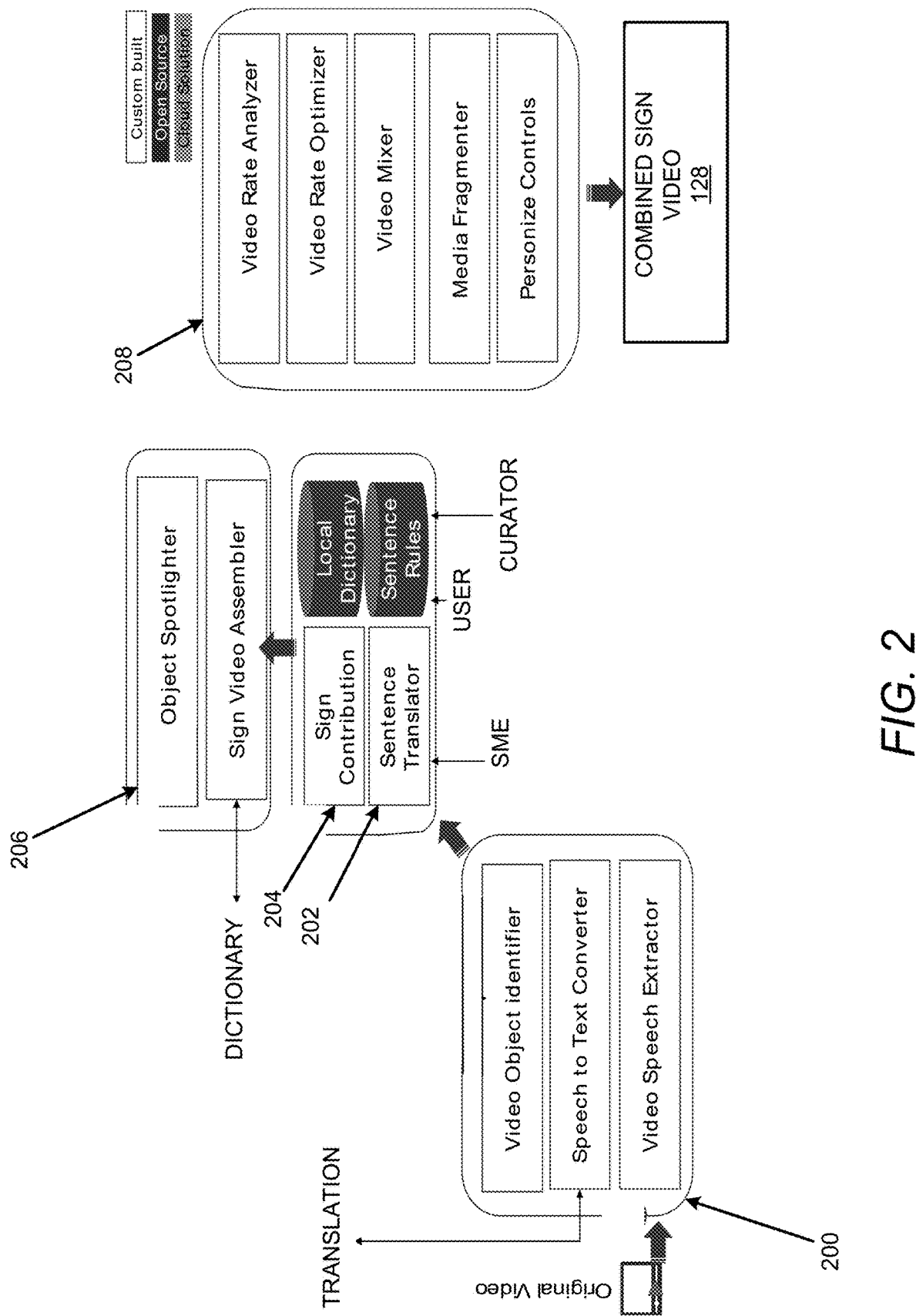
FIG. 2 illustrates further details of the layout of the natural language processing based sign language generation apparatus of FIG. 1 in accordance with an example of the present disclosure.

FIG. 2 illustrates further details of the layout of the apparatus 100 in accordance with an example of the present disclosure;

Referring to FIG. 2, at 200, the video analyzer 102 may ascertain a speech video 104 that is selected by a user 106. The video analyzer 102 may determine, based on application of natural language processing to contents of the speech video 104, a plurality of sentences 108 included in the speech video 104. Thus, the video analyzer 102 may perform video speech extraction, speech to text conversion, and video object identification (e.g., identification of objects/persons in the speech video 104).

At 202, the sentence structure analyzer 110 may determine, for each sentence of the plurality of sentences 108 identified in the speech video 104, a sign language sentence type 112. The sentence structure analyzer 110 may determine, for each sentence of the plurality of sentences 108 identified in the speech video 104 and based on the sign language sentence type 112, based on movement of specified words, a sign language sentence structure 114. Further, the sentiment analyzer 116 may determine, for each sentence of the plurality of sentences 108 identified in the speech video 104, a sentiment 118.

At 204, the sign video selector 120 may determine, for each sign language sentence structure and based on a corresponding sentiment, a sign video 122.

At 206, the sign video generator 126 may generate, based on the sign video 122 determined for each sentence of the plurality of sentences 108 identified in the speech video 104, a combined sign video 128.

At 208, the sign video generator 126 may perform various personalization adjustments to the combined sign video 128 that is to be generated. For example, the sign video generator 126 may identify, in the combined sign video 128, an object and/or a person. The sign video generator 126 may highlight, in the combined sign video 128, the identified object and/or person. The sign video generator 126 may also provide a link for each identified object and/or person. The link may be to pages such as a WIKIPEDIA page which a user may utilize to obtain more information about the object or person.

Referring again to FIG. 1, as disclosed herein, the apparatus 100 may provide for translation of a sentence to sign language sentence structure 114. The sign language sentence structure 114 may include time, topic, comment/action, and referent. The referent (e.g., nouns or pronouns) may appear before and/or after a comment/action.

Time for the sign language sentence structure 114 may include one word or a combination of words that represent time in a sentence (e.g., tomorrow, once upon a time etc.). According to another example, in the sentence "I am going to library today", "today" may denote time.

Topic for the sign language sentence structure 114 may include the main part/subject of the sentence. For example, in the sentence "I will go to library today", "library" may represent the topic.

Comment/action for the sign language sentence structure 114 may include what the subject does or what explains the subject. For example, in the sentence "I will go to library today", "go" may denote the comment/action.

Referent for the sign language sentence structure 114 may include the object/reference in the sentence. For example, in the sentence "I will go to library today", "I" may represent the referent.

The sentence structure analyzer 110 may identify the sign language sentence type 112, for example, as declarative (e.g., simple, compound, complex), and interrogative (e.g., questions) sentences to determine the pattern of translating sentences into a sign language. The sentence structure analyzer 110 may apply the following rules to identify sentence types using the part of speech (POS) aspect of an English sentence.

As a first rule, the sentence structure analyzer 110 may classify sentences that include only one subject (e.g., doer) and verb (e.g., action) as simple sentences. With respect to natural language processing, when a sentence has only one nsubj or nsubjpass and a root verb, then the sentence may be classified as a simple sentence. Moreover, sentences containing conjunction words may be identified as simple sentences when two subjects in a sentence are different and verbs and objects are the same (e.g., Ram eats apples and Shyam eats apples./Ram and Shyam eat apples), or both subjects and verbs are the same (e.g., Ram eats apples and Ram eats bananas./Ram eats apples and bananas).

As a second rule, the sentence structure analyzer 110 may classify sentences where there are two or more independent sentences (e.g., with different subjects and verbs) joined together by a coordinating conjunction such as 'and', 'for', 'but', 'or', 'nor', 'yet', 'so', as a compound sentence. With respect to natural language processing, two simple sentences with one subject-verb-object each and a "cconj" in the middle (e.g., left child and right child may be two simple sentences) may form a compound sentence, if the subjects are the same in both sentences, but the verbs and objects are different (e.g., Ram eats fruits and Ram drinks milk), or both subjects as well as verbs and objects are different in both sentences (e.g., Ram eats apples and Shyam sings songs).

As a third rule, the sentence structure analyzer 110 may classify sentences including dependent and independent phrases connected through words such as "although", "while", "because", "whether", "before", "after", "finally" "since", "then", "that", "which", "if" and "who" as complex sentences. In order to identify whether a dependent clause exists, a determination may be made as to whether there exists a verb in such sentences which have either of the following dependencies with their head words: clausal component (ccomp), open clausal component (xcomp), relative clause modifier (relcl)—seen when words such as that, while, who, which, etc., are found, and adverbial clause modifier (advcl)—seen when words relating to time are observed, such as when, after, before etc.

As a fourth rule, the sentence structure analyzer 110 may classify sentences as question when the question word {'why', 'where', 'who', 'which', 'when', 'how', 'what', 'whom', 'whose'} appears, and if the next word is any type of verb and the dependency of that verb is not a complex identifier ('advcl', 'ccomp', 'xcomp'). E.g. What is your name? Alternatively, the sentence structure analyzer 110 may classify sentences as question when the question verb |('is', 'are', 'were', 'was', 'do', 'did', 'has', 'have', 'had', 'can', 'could', 'shall', 'should', 'must', 'may', 'will', 'would')|$_{[GS1]}$appears and has no left child and the next word is a subject (nsubj/nsubjpass) or object(pobj/dobj)—a noun/pronoun (e.g., Did you have your breakfast?).

As a fifth rule, the sentence structure analyzer 110 may classify sentences where there are also certain broken sentences or phrases which do not follow any basic sentence structure of having a subject, verb or object, as clauses, and signed word by word in the same order as appearing in the English sentence.

Once the sentences are identified for their types, the sentence structure analyzer 110 may then translate the sentences by transferring the English words into the sign language sentence structure. While translating, the sentence structure analyzer 110 may consider the results of the natural language processing to identify some rules of translating an English sentence into a sign language sentence. For the example sentence "I am going to the library tomorrow", a word dependency table 300 through natural language processing may be configured as shown in FIG. 3.

Referring to FIG. 3, for the word dependency table 300, the hearing word may represent the word from the English sentence. The lemma may represent the base form of the word in the sentence (e.g., "go" is the lemma for the word "going"). The PoS may represent the Part of Speech for the word in the sentence, whether the word is a noun, pronoun, adjective, adverb, conjunction, interjection, preposition or verb. The "Dep" may represent the type of dependency that the word has with its root word. The root word may represent the root word for the current word in the sentence. The left child may represent the list of words that are associated on the left side of the current word in the sentence, when it is taken as the root. The right child may represent the list of words that are associated on the right of the current word in the sentence, when it is taken as the root.

Figure 4:
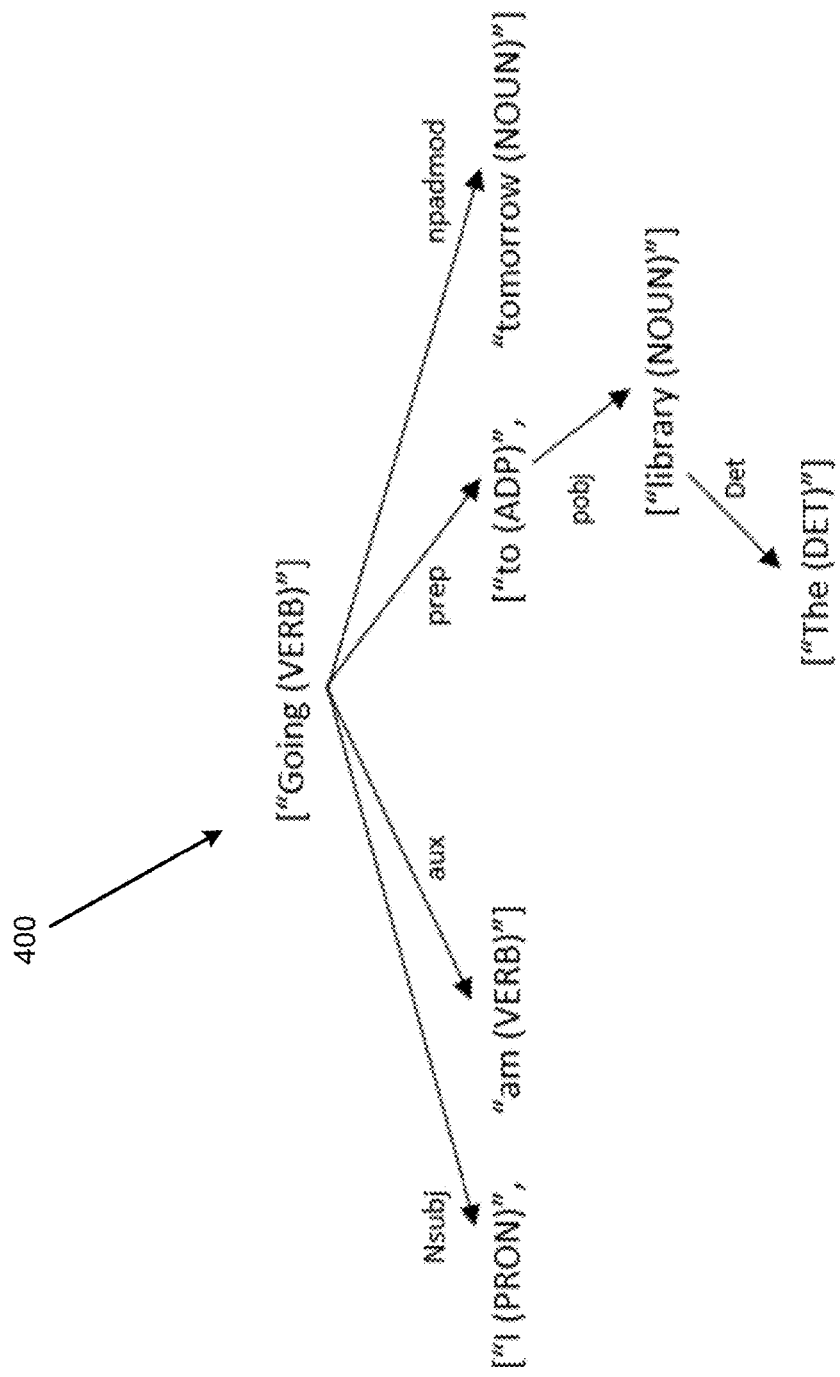
FIG. 4 illustrates a tree representation for a sentence to illustrate operation of the natural language processing based sign language generation apparatus of FIG. 1 in accordance with an example of the present disclosure.

FIG. 4 illustrates a tree representation for a sentence to illustrate operation of the apparatus 100 in accordance with an example of the present disclosure.

Referring to FIG. 4, with respect to the word dependency table 300, the sentence may be represented in the form of a tree as shown at 400. For example, for the sentence "I am going to the library tomorrow", the tree is shown at 400.

With respect to translation to sign language, the sentence structure analyzer 110 may implement the following rules.

According to a first rule, with respect to translation to sign language, sign language such as that used in countries such as the United States for a simple sentence may follow a Subject-Verb-Object order (as seen from the English prospective), and may include the structure TIME-TOPIC-COMMENT/ACTION-REFERRENT in sign language.

According to a second rule, if the sentence talks about time, or has any word conveying time, then that part of the sentence forms the beginning of the sign sentence (TIME). For example, the sentence "I will go to the library tomorrow" may be signed (e.g., converted to sign language) as "TOMORROW LIBRARY GO I", starting with the time component "Tomorrow".

According to a third rule, if the dependencies (Dep) of a word include a nominal subject (nsubj) or a noun-compound (compound), then the word and all of its children on the left may be taken as the topic. This is mainly the subject of the English sentence and may form the second part of the sign sentence (TOPIC). For example, the sentence "Peter and his uncle are travelling to Denmark tomorrow" has an nsubj "Peter" and a compound "and his uncle". This sentence may be signed as "TOMORROW PETER HIS UNCLE TRAVEL DENMARK".

According to a fourth rule, if the part of speech (PoS) of the word is verb or adverb, the word may be taken as the action/comment. This may represent the main verb of the English sentence, and form the third part of the sign sentence (COMMENT/ACTION). For example, the sentence "I exercise regularly in the morning" may be signed as "MORNING I EXERCISE REGULARLY").

According to a fifth rule, the remaining words of the sentence may form the object of the sentence, and may become the last part of the sign sentence (e.g., the object or referent). This part may include one or more of the words which have part of speech (PoS) as noun, pronoun (PRON), proper noun (PROPN), number (NUM), adposition (ADP), adjective (ADJ) and/or dependencies (Dep) as direct object (dobj), prepositional object (pobj), adverbial modifier (advmod), numeric modifier (nummod), noun phrase as adverbial modifier (npadvmod), clausal modifier of noun (acl). For example, in the sentence "My health improved after two therapy sessions", the phrase "after two therapy sessions" may become the object of the sentence containing:

"after" part of speech (PoS)→adposition (ADP); Dependency (Dep)→Preposition (prep), "two" part of speech (PoS)→Number; Dependency (Dep) →numeric modifier (nummod), "therapy" part of speech (PoS)→Noun; Dependency (Dep)→compound, "sessions" part of speech (PoS)→Noun; Dependency (Dep)→Prepositional object (pobj)).

According to a sixth rule, the parts of speech (PoS) which are included in the sign language may include noun (NOUN), pronoun (PRON), proper noun (PROPN), verb (VERB), adverb (ADV), adjective (ADJ), coordinating conjunction (CCONJ), cardinal number (NUM), and adverbial preposition (ADP). The lemma (base word) of the words with the above-mentioned parts of speech (PoS) may be taken for the sign sentence formation, as sign language may not include tenses.

According to a seventh rule, there may be exceptions for exclusion of some words with parts of speech (as that mentioned in the above point). If the lemma of the word is "be" or the dependency of the word is "aux", then the word may not be included in the sign language sentence (e.g., for the sentence, "I am going to office", the lemma for word "am" is "be", and the word dependency is "aux". Thus, the signed sentence may exclude the word "am").

According to an eighth rule, if the lemma of the word is a "-PRON-", then the word itself may be included in the sign language sentence (e.g., for the English sentence "Let us see the table", the lemma for the word "us" may be identified as "-PRON-", and thus the word "us" may be signed in the sign language).

According to a ninth rule, sign language may not use tenses, determinants, interjections etc. Thus, a list of parts of speech (PoS) and dependencies (Dep) which are not included in the sign sentences may be formed. The elements of this list may be categorized as the list of exclusions, which may include particles (PART) (e.g., infinitive "to" in the sentence "I like to sing"), VERB with dependency (Dep) as Auxiliary (aux) (e.g., the word "am" in the sentence "I am going to the library"), determinants (DET) (articles "the", "an", "a"), conjunctions (CONJ) (e.g., and, but, thus, so, etc.), and interjection (INTJ). While forming the sign sentences, words that fall in the exclusion list may be excluded, and the rest of the words may be included (e.g., while translating the sentence "I am going to the library" to sign language, the words "am" and "the" may not be signed).

According to a tenth rule, there may also be an exception for including determinants (DET) (e.g., if the word is "No" and the dependency (DEP) is not "det", then the word may be included in the sign sentence).

The sentiment analyzer 116 may identify the sentiment 118 of the sentence using sentiment analysis. In this regard, the sentiment analyzer 116 may utilize machine learning to identify sentiment of each sentence. The sentiment may include, for example, joy, sorrow, thinking, etc. The sentiment may be used to ensure a sign video with face expression aligned to the sentiment is shown to the user 106.

The sign video selector 120 may utilize the sign sentence with words and sentiment of the sentence to select the sign video 122. For example, the sign video selector 120 may select a sign video for each word. The sign videos may include publicly available sign videos, and sign videos that have been created and stored in the repository 124.

The sign video selector 120 may utilize video analytics to pick the sign video that is aligned to the sentiment. For example, by using video analytics capabilities, the sign video selector 120 may determine the facial expression, if the facial expression is happy, sorrow, excitement, thinking, etc.

The sign video selector 120 may select the sign video that is aligned to the user preferred sign language. Examples of preferred sign languages may include American English sign language, Australian English sign language, etc.

Given the sentiment of the sentence, and the identification of the relevant sign videos that match the sentiment of the sentence, the sign video generator 126 may combine the relevant sign videos in accordance with the start and finish times of sentences in the speech video 104. In this regard, the sign video generator 126 may stitch the sign videos together and create the combined sign video 128.

The sign video generator 126 may perform video analytics to enhance user experience. For example, the sign video generator 126 may identify objects and people (e.g., a person or multiple people) in the speech video 104. For example, the sign video generator 126 may perform video analytics to identify objects present in a speech video, the timestamp in which the object is present, and the coordinate of the object within the screen space.

When an object or person in the speech video 104 is signed, the sign video generator 126 may highlight the person or object in the combined sign video 128. For example, when an object or person is signed, if the video analytics capability provided information about the object or person, the sign video generator 126 may highlight the object or person in combined sign video 128.

Figure 5:
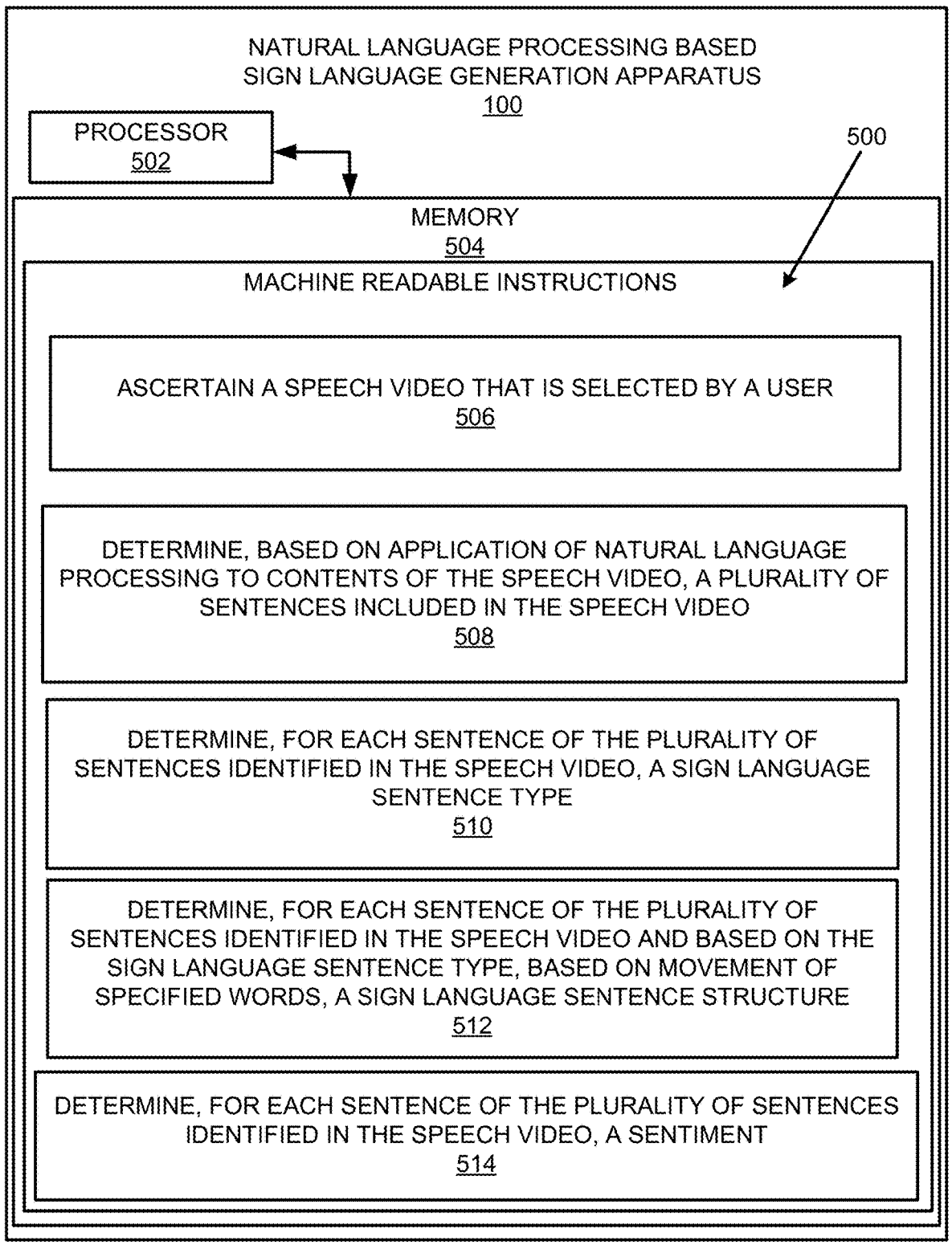
FIG. 5 illustrates an example block diagram for natural language processing based sign language generation in accordance with an example of the present disclosure.
Figure 5:
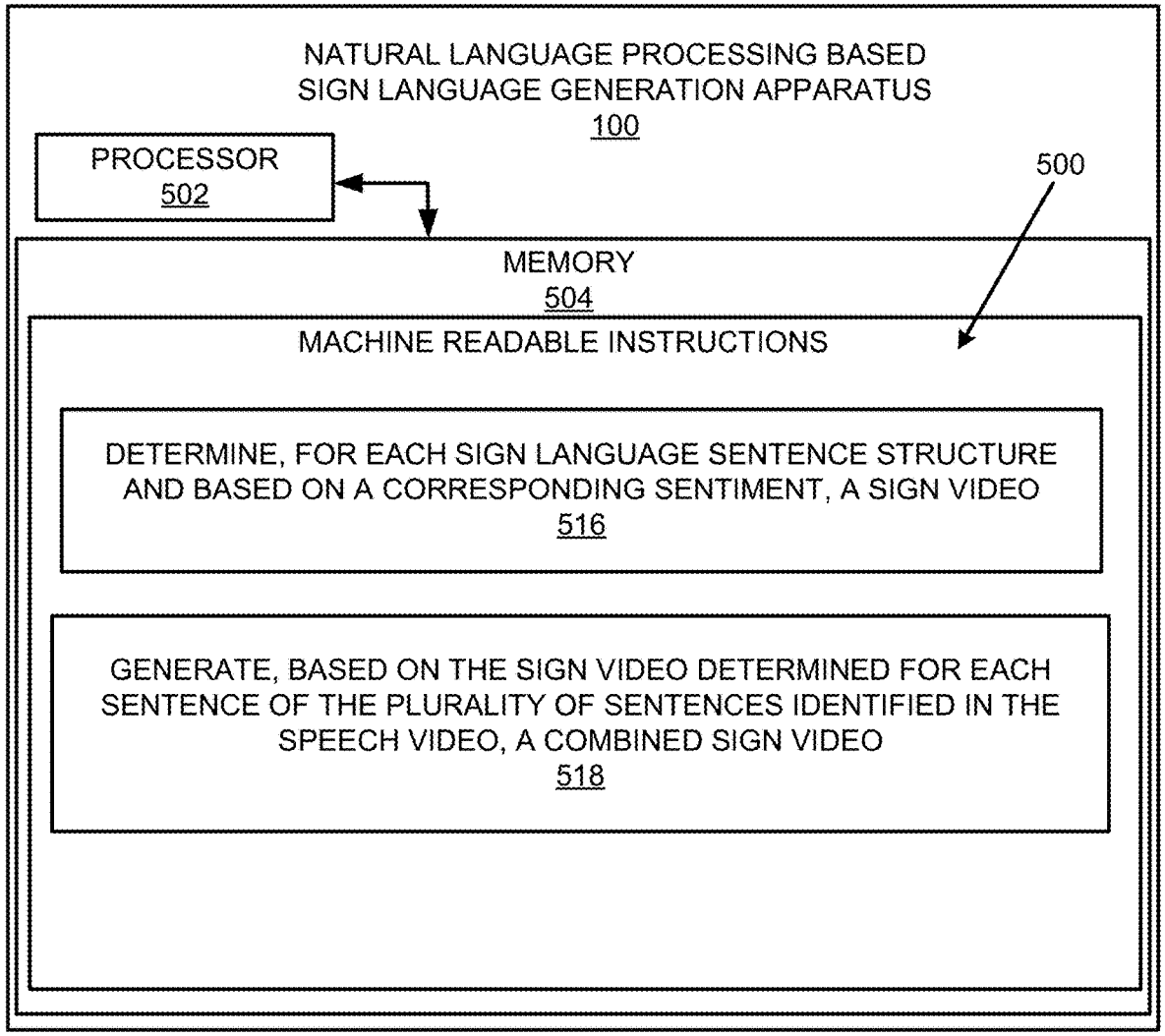
Figure 7:
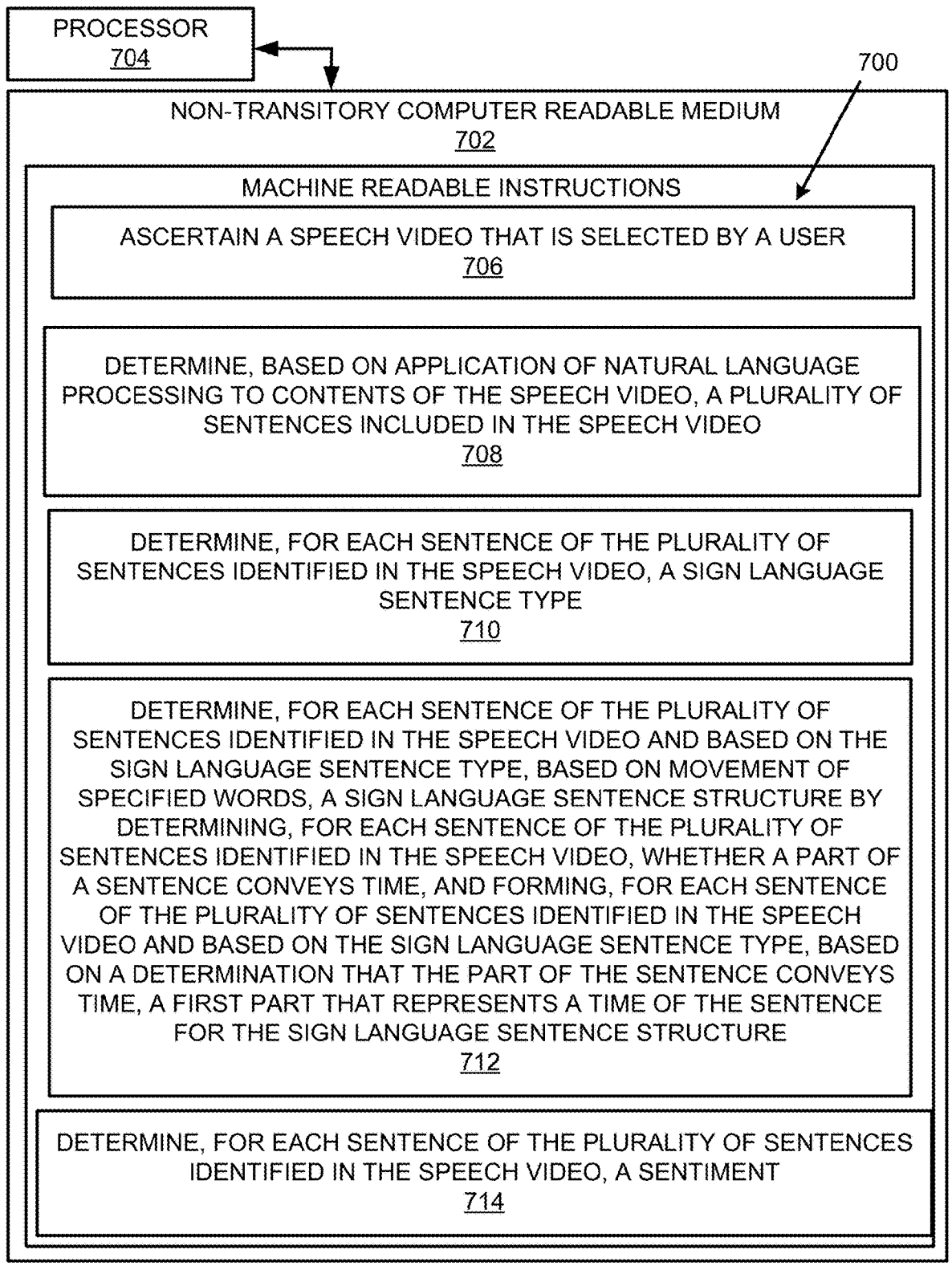
FIG. 7 illustrates a further example block diagram for natural language processing based sign language generation in accordance with another example of the present disclosure.
Figure 7:
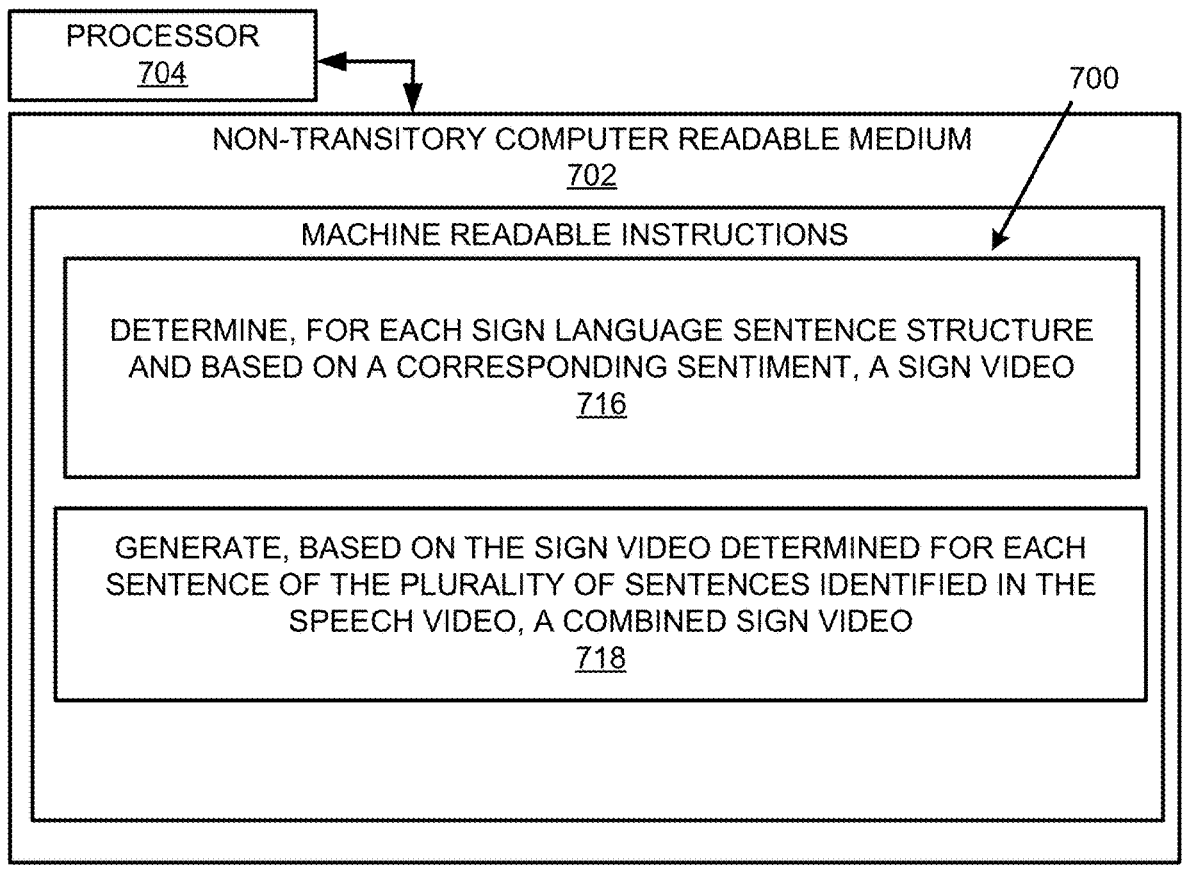

FIGS. 5-7 respectively illustrate an example block diagram 500, a flowchart of an example method 600, and a further example block diagram 700 for natural language processing based sign language generation, according to examples. The block diagram 500, the method 600, and the block diagram 700 may be implemented on the apparatus 100 described above with reference to FIG. 1 by way of example and not of limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 storing machine readable instructions that when executed by the processor cause the processor to perform the instructions of the block diagram 500. The memory 504 may represent a non-transitory computer readable medium. FIG. 6 may represent an example method for natural language processing based sign language generation, and the steps of the method. FIG. 7 may represent a non-transitory computer readable medium 702 having stored thereon machine readable instructions to provide natural language processing based sign language generation according to an example. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to ascertain a speech video 104 that is selected by a user 106.

The processor 502 may fetch, decode, and execute the instructions 508 to determine, based on application of natural language processing to contents of the speech video 104, a plurality of sentences 108 included in the speech video 104.

The processor 502 may fetch, decode, and execute the instructions 510 to determine, for each sentence of the plurality of sentences 108 identified in the speech video 104, a sign language sentence type 112.

The processor 502 may fetch, decode, and execute the instructions 512 to determine, for each sentence of the plurality of sentences 108 identified in the speech video 104 and based on the sign language sentence type 112, based on movement of specified words, a sign language sentence structure 114.

The processor 502 may fetch, decode, and execute the instructions 514 to determine, for each sentence of the plurality of sentences 108 identified in the speech video 104, a sentiment 118.

The processor 502 may fetch, decode, and execute the instructions 516 to determine, for each sign language sentence structure and based on a corresponding sentiment, a sign video 122.

The processor 502 may fetch, decode, and execute the instructions 518 to generate, based on the sign video 122 determined for each sentence of the plurality of sentences 108 identified in the speech video 104, a combined sign video 128.

Referring to FIGS. 1-4 and 6, and particularly FIG. 6, for the method 600, at block 602, the method may include ascertaining, by at least one hardware processor, a speech video 104 that is selected by a user 106.

At block 604, the method may include determining, by the at least one hardware processor and based on application of natural language processing to contents of the speech video 104, a plurality of sentences 108 included in the speech video 104.

At block 606, the method may include determining, by the at least one hardware processor and based on application of the natural language processing to the contents of the speech video 104, a duration of each sentence of the plurality of sentences included in the speech video 104.

At block 608, the method may include determining, by the at least one hardware processor and for each sentence of the plurality of sentences 108 identified in the speech video 104, a sign language sentence type 112.

At block 610, the method may include determining, by the at least one hardware processor and for each sentence of the plurality of sentences identified in the speech video 104 and based on the sign language sentence type 112, based on movement of specified words, a sign language sentence structure 114.

At block 612, the method may include determining, by the at least one hardware processor and for each sentence of the plurality of sentences 108 identified in the speech video 104, a sentiment 118.

At block 614, the method may include determining, by the at least one hardware processor and for each sign language sentence structure and based on a corresponding sentiment, a sign video 122.

At block 616, the method may include generating, by the at least one hardware processor, based on the sign video determined for each sentence of the plurality of sentences 108 identified in the speech video 104 and based on the duration of each sentence of the plurality of sentences included in the speech video 104, a combined sign video 128.

Referring to FIGS. 1-4 and 7, and particularly FIG. 7, for the block diagram 700, the non-transitory computer readable medium 702 may include instructions 706 to ascertain a speech video 104 that is selected by a user 106.

The processor 704 may fetch, decode, and execute the instructions 708 to determine, based on application of natural language processing to contents of the speech video 104, a plurality of sentences included in the speech video 104.

The processor 704 may fetch, decode, and execute the instructions 710 to determine, for each sentence of the plurality of sentences 108 identified in the speech video 104, a sign language sentence type 112.

The processor 704 may fetch, decode, and execute the instructions 712 to determine, for each sentence of the plurality of sentences 108 identified in the speech video and based on the sign language sentence type 112, based on movement of specified words, a sign language sentence structure 114 by determining, for each sentence of the plurality of sentences 108 identified in the speech video 104, whether a part of a sentence conveys time, and forming, for each sentence of the plurality of sentences identified in the speech video 104 and based on the sign language sentence type 112, based on a determination that the part of the sentence conveys time, a first part that represents a time of the sentence for the sign language sentence structure 114.

The processor 704 may fetch, decode, and execute the instructions 714 to determine, for each sentence of the plurality of sentences 108 identified in the speech video 104, a sentiment 118.

The processor 704 may fetch, decode, and execute the instructions 716 to determine, for each sign language sentence structure and based on a corresponding sentiment 118, a sign video 122.

The processor 704 may fetch, decode, and execute the instructions 718 to generate, based on the sign video 122 determined for each sentence of the plurality of sentences 108 identified in the speech video 104, a combined sign video 128.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A natural language processing based sign language generation apparatus comprising:
   at least one hardware processor;
   a video analyzer, executed by the at least one hardware processor, to
      ascertain a speech video that is selected by a user, and
      identify, based on application of natural language processing to contents of the speech video, a plurality of sentences included in the speech video;
   a sentence structure analyzer, executed by the at least one hardware processor, to
      determine, for each sentence of the plurality of sentences identified in the speech video, a sign language sentence type, and
      determine, for each sentence of the plurality of sentences identified in the speech video and based on the sign language sentence type, based on movement of specified words, a sign language sentence structure;
   a sentiment analyzer, executed by the at least one hardware processor, to
      determine, for each sentence of the plurality of sentences identified in the speech video, a sentiment;
   a sign video selector, executed by the at least one hardware processor, to
      determine, for each sign language sentence structure and based on a corresponding sentiment, a sign video; and
   a sign video generator, executed by the at least one hardware processor, to
      generate, based on the determined sign videos, a combined sign video.

2. The apparatus according to claim 1, wherein the video analyzer is executed by the at least one hardware processor to:
   identify, based on application of the natural language processing to the contents of the speech video, a duration of each sentence of the plurality of sentences included in the speech video.

3. The apparatus according to claim 1, wherein the sentence structure analyzer is executed by the at least one hardware processor to determine, for each sentence of the plurality of sentences identified in the speech video, the sign language sentence type by:
   determining, for each sentence of the plurality of sentences identified in the speech video, whether a sentence includes a conjunction word; and for each sentence of the plurality of sentences identified in the speech video, based on a determination that the sentence includes the conjunction word, classifying the sentence as a compound.

4. The apparatus according to claim 1, wherein the sentence structure analyzer is executed by the at least one hardware processor to determine, for each sentence of the plurality of sentences identified in the speech video, the sign language sentence type by:
  determining, for each sentence of the plurality of sentences identified in the speech video, whether a sentence includes a "wh" word; and
  for each sentence of the plurality of sentences identified in the speech video, based on a determination that the sentence includes the "wh" word, classifying the sentence as a question.

5. The apparatus according to claim 1, wherein the sentence structure analyzer is executed by the at least one hardware processor to determine, for each sentence of the plurality of sentences identified in the speech video, the sign language sentence type by:
  determining, for each sentence of the plurality of sentences identified in the speech video, whether a sentence does not include a nominal subject; and
  for each sentence of the plurality of sentences identified in the speech video, based on a determination that the sentence does not include the nominal subject, classifying the sentence as a clause.

6. The apparatus according to claim 1, wherein the sentence structure analyzer is executed by the at least one hardware processor to determine, for each sentence of the plurality of sentences identified in the speech video and based on the sign language sentence type, based on movement of specified words, the sign language sentence structure by:
  excluding, for each sentence of the plurality of sentences identified in the speech video, particles, words with dependencies, determinants, conjunctions, and interjections; and
  determining, for each sentence of the plurality of sentences identified in the speech video and based on the sign language sentence type, based on the exclusion of particles, words with dependencies, determinants, conjunctions, and interjections, the sign language sentence structure.

7. The apparatus according to claim 1, wherein the sentence structure analyzer is executed by the at least one hardware processor to determine, for each sentence of the plurality of sentences identified in the speech video and based on the sign language sentence type, based on movement of specified words, the sign language sentence structure by:
  determining, for each sentence of the plurality of sentences identified in the speech video, whether a part of a sentence conveys time; and
  forming, for each sentence of the plurality of sentences identified in the speech video and based on the sign language sentence type, based on a determination that the part of the sentence conveys time, a first part that represents a time of the sentence for the sign language sentence structure.

8. The apparatus according to claim 7, wherein the sentence structure analyzer is executed by the at least one hardware processor to determine, for each sentence of the plurality of sentences identified in the speech video and based on the sign language sentence type, based on movement of specified words, the sign language sentence structure by:
  determining, for each sentence of the plurality of sentences identified in the speech video, whether a dependency of a word is a nominal subject or a compound; and
  forming, for each sentence of the plurality of sentences identified in the speech video and based on the sign language sentence type, based on a determination that the dependency of the word is the nominal subject or the compound, a second part that represents a topic of the sentence for the sign language sentence structure.

9. The apparatus according to claim 8, wherein the sentence structure analyzer is executed by the at least one hardware processor to determine, for each sentence of the plurality of sentences identified in the speech video and based on the sign language sentence type, based on movement of specified words, the sign language sentence structure by:
  determining, for each sentence of the plurality of sentences identified in the speech video, whether a part of a word is a verb or an adverb; and
  forming, for each sentence of the plurality of sentences identified in the speech video and based on the sign language sentence type, based on a determination that the part of the word is the verb or the adverb, a third part that represents a comment or action of the sentence for the sign language sentence structure.

10. The apparatus according to claim 9, wherein the sentence structure analyzer is executed by the at least one hardware processor to determine, for each sentence of the plurality of sentences identified in the speech video and based on the sign language sentence type, based on movement of specified words, the sign language sentence structure by:
  determining, for each sentence of the plurality of sentences identified in the speech video, remaining words of the sentence; and
  forming, for each sentence of the plurality of sentences identified in the speech video and based on the sign language sentence type, based on a determination of the remaining words of the sentence, a fourth part that represents a referent of the sentence for the sign language sentence structure.

11. The apparatus according to claim 1, wherein the sign video selector is executed by the at least one hardware processor to:
  identify a language type associated with a preferred sign language of the user; and
  determine, for each sign language sentence structure and based on a corresponding sentiment, and based on the identification of the language type associated with the preferred sign language of the user, the sign video.

12. The apparatus according to claim 1, wherein the sign video generator is executed by the at least one hardware processor to:
  identify, in the combined sign video, at least one of an object or a person; and
  highlight, in the combined sign video, the identified at least one of the object or the person.

13. A method for natural language processing based sign language generation, the method comprising:
  ascertaining, by at least one hardware processor, a speech video that is selected by a user;
  identifying, by the at least one hardware processor and based on application of natural language processing to contents of the speech video, a plurality of sentences included in the speech video;

determining, by the at least one hardware processor and based on application of the natural language processing to the contents of the speech video, a duration of each sentence of the plurality of sentences identified in the speech video;

determining, by the at least one hardware processor and for each sentence of the plurality of sentences identified in the speech video, a sign language sentence type;

determining, by the at least one hardware processor and for each sentence of the plurality of sentences identified in the speech video and based on the sign language sentence type, based on movement of specified words, a sign language sentence structure;

determining, by the at least one hardware processor and for each sentence of the plurality of sentences identified in the speech video, a sentiment;

determining, by the at least one hardware processor and for each sign language sentence structure and based on a corresponding sentiment, a sign video;

generating, by the at least one hardware processor, based on the determined sign videos and based on the duration of each sentence of the plurality of sentences identified in the speech video, a combined sign video.

14. The method according to claim 13, wherein determining, for each sentence of the plurality of sentences identified in the speech video, the sign language sentence type further comprises:
determining, for each sentence of the plurality of sentences identified in the speech video, whether a sentence includes a conjunction word; and
for each sentence of the plurality of sentences identified in the speech video, based on a determination that the sentence includes the conjunction word, classifying the sentence as a compound.

15. The method according to claim 13, wherein determining, for each sentence of the plurality of sentences identified in the speech video, the sign language sentence type further comprises:
determining, for each sentence of the plurality of sentences identified in the speech video, whether a sentence includes a "wh" word; and
for each sentence of the plurality of sentences identified in the speech video, based on a determination that the sentence includes the "wh" word, classifying the sentence as a question.

16. The method according to claim 13, wherein determining, for each sentence of the plurality of sentences identified in the speech video, the sign language sentence type further comprises:
determining, for each sentence of the plurality of sentences identified in the speech video, whether a sentence does not include a nominal subject; and
for each sentence of the plurality of sentences identified in the speech video, based on a determination that the sentence does not include the nominal subject, classifying the sentence as a clause.

17. The method according to claim 13, wherein determining, for each sentence of the plurality of sentences identified in the speech video and based on the sign language sentence type, based on movement of specified words, the sign language sentence structure further comprises:
excluding, for each sentence of the plurality of sentences identified in the speech video, particles, words with dependencies, determinants, conjunctions, and interjections; and determining, for each sentence of the plurality of sentences identified in the speech video and based on the sign language sentence type, based on the exclusion of particles, words with dependencies, determinants, conjunctions, and interjections, the sign language sentence structure.

18. A non-transitory computer readable medium having stored thereon machine readable instructions, the machine readable instructions, when executed by at least one hardware processor, cause the at least one hardware processor to:
ascertain a speech video that is selected by a user;
identify, based on application of natural language processing to contents of the speech video, a plurality of sentences included in the speech video;
determine, for each sentence of the plurality of sentences identified in the speech video, a sign language sentence type;
determine, for each sentence of the plurality of sentences identified in the speech video and based on the sign language sentence type, based on movement of specified words, a sign language sentence structure by
determining, for each sentence of the plurality of sentences identified in the speech video, whether a part of a sentence conveys time, and
forming, for each sentence of the plurality of sentences identified in the speech video and based on the sign language sentence type, based on a determination that the part of the sentence conveys time, a first part that represents a time of the sentence for the sign language sentence structure;
determine, for each sentence of the plurality of sentences identified in the speech video, a sentiment;
determine, for each sign language sentence structure and based on a corresponding sentiment, a sign video; and
generate, based on the determined sign videos, a combined sign video.

19. The non-transitory computer readable medium according to claim 18, wherein the machine readable instructions to determine, for each sentence of the plurality of sentences identified in the speech video and based on the sign language sentence type, based on movement of specified words, the sign language sentence structure, when executed by the at least one hardware processor, further cause the at least one hardware processor to:
determine, for each sentence of the plurality of sentences identified in the speech video, whether a dependency of a word is a nominal subject or a compound; and
form, for each sentence of the plurality of sentences identified in the speech video and based on the sign language sentence type, based on a determination that the dependency of the word is the nominal subject or the compound, a second part that represents a topic of the sentence for the sign language sentence structure.

20. The non-transitory computer readable medium according to claim 19, wherein the machine readable instructions to determine, for each sentence of the plurality of sentences identified in the speech video and based on the sign language sentence type, based on movement of specified words, the sign language sentence structure, when executed by the at least one hardware processor, further cause the at least one hardware processor to:
determine, for each sentence of the plurality of sentences identified in the speech video, whether a part of a word is a verb or an adverb; and
form, for each sentence of the plurality of sentences identified in the speech video and based on the sign language sentence type, based on a determination that the part of the word is the verb or the adverb, a third part that represents a comment or action of the sentence for the sign language sentence structure.

\* \* \* \* \*